United States Patent
Ko et al.

(10) Patent No.: US 9,355,471 B2
(45) Date of Patent: May 31, 2016

(54) COLOR BALANCING APPARATUS FOR MULTIPLE IMAGE SYNTHESIS AND METHOD THEREFOR

(75) Inventors: Sung-Jea Ko, Seoul (KR); Seung-Kyun Kim, Seongnam Si Gyeonggi-Do (KR); Seung-Won Jung, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 23 days.

(21) Appl. No.: 14/126,235

(22) PCT Filed: Jan. 9, 2012

(86) PCT No.: PCT/KR2012/000208
§ 371 (c)(1),
(2), (4) Date: Dec. 13, 2013

(87) PCT Pub. No.: WO2012/173320
PCT Pub. Date: Dec. 20, 2012

(65) Prior Publication Data
US 2014/0126815 A1    May 8, 2014

(30) Foreign Application Priority Data
Jun. 13, 2011   (KR) .................. 10-2011-0056655

(51) Int. Cl.
G06T 11/00   (2006.01)
G06T 11/60   (2006.01)
H04N 9/73    (2006.01)

(52) U.S. Cl.
CPC ............... *G06T 11/001* (2013.01); *G06T 11/60* (2013.01); *H04N 9/735* (2013.01)

(58) Field of Classification Search
None
See application file for complete search history.

(56) References Cited

U.S. PATENT DOCUMENTS 6,714,249 B2 *   3/2004   May et al. .................... 348/373

FOREIGN PATENT DOCUMENTS

| JP | 10308890 A    | 11/1998 |
| JP | 2009147465 A  | 7/2009  |
| KR | 100150056 B1  | 6/1998  |
| KR | 100916484 B1  | 9/2009  |

OTHER PUBLICATIONS

Lam, Edmund Y., and George SK Fung. "Automatic white balancing in digital photography." Single-sensor imaging: Methods and applications for digital cameras (2008): 267-294.*

* cited by examiner

*Primary Examiner* — Bhavesh Mehta
*Assistant Examiner* — Menatoallah Youssef
(74) *Attorney, Agent, or Firm* — William Park & Associates Ltd.

(57) ABSTRACT

A color balancing apparatus for multiple image synthesis and a method therefore, in which an automatic white balance unit, with respect to each of a plurality of input images that are obtained by sequentially capturing adjacent scenes, is configured to compare a neutral color representing the input image with chromaticity of standard sources that are predefined, determine a standard source which is closest to the neutral color among the standard sources as a standard illuminant, and perform a white balance on the input image based on the standard illuminant, so that a natural wide-area synthesis image is generated by use of a light source estimation scheme considering multiple light sources, without complex computation of the conventional wide-area image synthesis, are provided.

15 Claims, 8 Drawing Sheets

(a)

(b)

(c)

(a)

(b)

(c)

(d)

(a)

(b)

(c)

(d)

(a)

(b)

COLOR BALANCING APPARATUS FOR MULTIPLE IMAGE SYNTHESIS AND METHOD THEREFOR

CROSS-REFERENCE TO RELATED APPLICATION

This application claims priority to and the benefit of Korean Patent Application No. 10-2011-0056655, filed on Jun. 13, 2011, the disclosure of which is incorporated herein by reference in its entirety.

BACKGROUND

1. Field of the Invention

The present invention relates to a color balancing scheme for multiple image synthesis, and more particularly, to technology for a color balancing apparatus for reducing a color difference between input images synthesized by an image synthesizing apparatus configured to generate a wide-area image, such as a panorama image from a plurality of input images, and a method therefor.

2. Discussion of Related Art

Wide-area image synthesis technology is an alternative technology to overcome a limited viewing angle when an image is acquired through a mobile phone camera or a digital camera, by connecting consecutive input images to one another into a single wide-area image.

As for the conventional studies, an image synthesis is performed by using an α-blending algorithm for natural synthesis among a plurality of images. According to the α-blending algorithm, one of the representative blending algorithms, two images are mixed at an appropriate ratio and viewed in an overlapping manner. However, when the α-blending algorithm is applied to images that are not completely matched to each other, a ghost phenomenon occurs and thus an image appears to be doubled.

Meanwhile, even when photography is performed at the same region, various factors, such as physical properties of an object to be photographed, lighting conditions of a photographing location, and characteristics of a camera, may affect the image photographed. In this case, a color difference between images as a result from photographing at different lightings may be reduced using an automatic white balance (AWB) algorithm, but a color difference caused by other factors still remains.

In addition, conventional algorithms require too much computation in common, and thus are unsuitable for being directly applied to an image wide-area synthesis application in a mobile device.

Accordingly, there is a need for a color balancing apparatus for generating a natural wide-area synthesis image by reducing the color difference between synthesized input images while avoiding complex computation of the conventional algorithm, and a method therefor.

SUMMARY OF THE INVENTION

The present invention is directed to a color balancing apparatus for multiple image synthesis capable of generating a natural wide-area synthesis image by use of a light source estimation scheme considering multiple light sources while avoiding complex computation of the conventional wide-area image synthesis, and a method therefor.

The present invention is also directed to a computer readable recording medium recording a program for executing a color balancing method for multiple image synthesis capable of generating a natural wide-area synthesis image by use of a light source estimation scheme considering multiple light sources while avoiding complex computation of the conventional wide-area image synthesis on a computer.

According to an aspect of the present invention, there is provided a color balancing apparatus for multiple image synthesis, the color balancing apparatus including an automatic white balance unit, with respect to each of a plurality of input images that are obtained by sequentially capturing adjacent scenes, configured to compare a neutral color representing the input image with chromaticity of standard sources that are predefined, determine a standard source which is closest to the neutral color among the standard sources as a standard illuminant, and perform a white balance on the input image based on the standard illuminant; and a wide-area image synthesis unit configured to generate a single wide-area image by synthesizing the plurality of input images subjected to the white balance based on the standard illuminant.

According to another aspect of the present invention, there is provided a color balancing method for multiple image synthesis, the color balancing method including: an automatic white balance, with respect to each of a plurality of input images that are obtained by sequentially capturing adjacent scenes, comparing a neutral color representing the input image with chromaticity of standard sources that are predefined, determining a standard source which is closest to the neutral color among the standard sources as a standard illuminant, and performing a white balance on the input image based on the standard illuminant; and a wide-area image synthesis generating a single wide-area image by synthesizing the plurality of input images subjected to the white balance based on the standard illuminant.

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Figure 1:
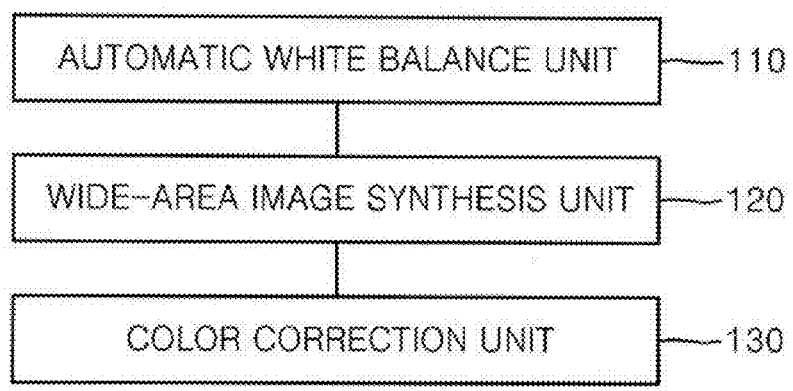
FIG. 1 is a block diagram illustrating an example of configuration of a color balancing apparatus for multiple image synthesis and a method therefor.

FIG. 1 is a block diagram illustrating an example of configuration of a color balancing apparatus for multiple image synthesis and a method therefor.

Referring to FIG. 1, a color balancing apparatus for multiple image synthesis includes an automatic white balance unit 110, a wide-area image synthesis unit 120 and a color correction unit 130.

The automatic white balance unit 110 determines a standard illuminant of an input image based on a neutral color representing the input image, and performs an automatic white balance (AWB) based on the determined standard illuminant. Hereinafter, a process of the automatic white balance unit 110 estimating a standard illuminant of an input image will be described first, and an AWB will be described.

First, the automatic white balance unit 110 extracts a neutral color representing an input image, and based on the neutral color, determines a standard illuminant. In this case, the automatic white balance unit 110 assumes that multiple standards sources may exist with respect to input images to be synthesized into a wide-area image.

The automatic white balance unit 110 may use a multiple assumption based light source estimation scheme to determine a neutral color. According to the multiple assumption based light source estimation scheme, a neutral color is determined through a grey world assumption, a white patch assumption, and a color clustering assumption.

The automatic white balance unit 110 determines a neutral color with respect to each of the input images, compares the neutral color with chromaticity of a standard source adopted by the International Commission on Illumination (CIE), and determines a standard source which is closest to the neutral color as a standard illuminant of the input image. In addition, as a reference for determining whether the standard illuminant is accurately determined, a confidence region with respect to each standard source may be set on the chromaticity diagram.

Figure 2:
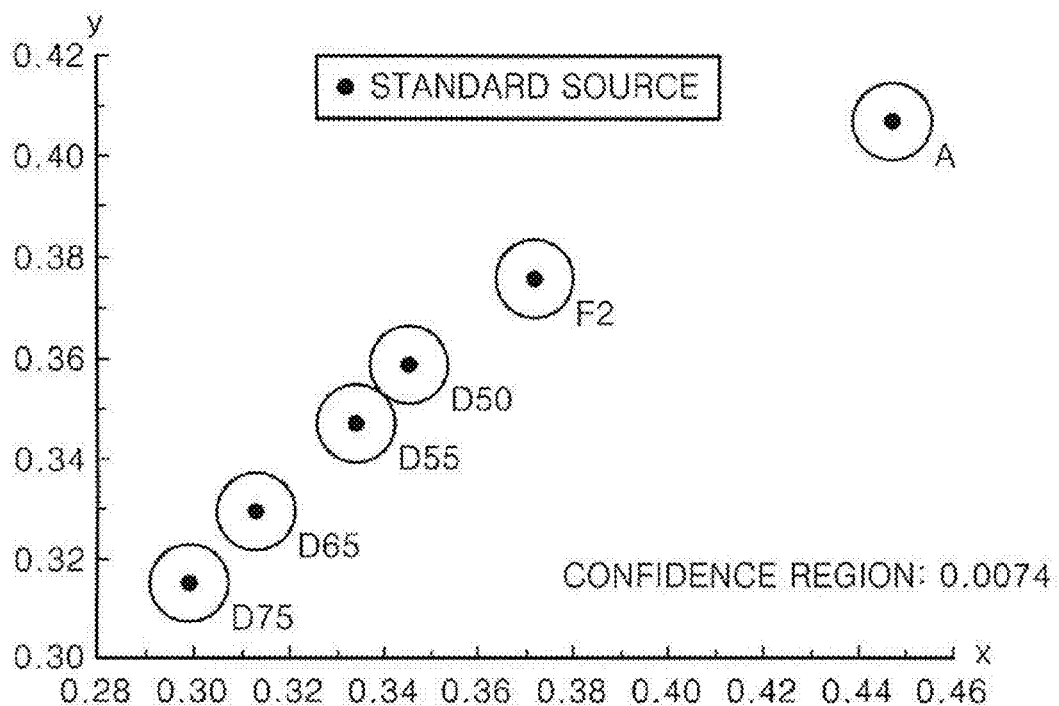
FIG. 2 is a drawing illustrating six standard sources and confidence regions corresponding to the six standard sources, respectively.

FIG. 2 is a drawing illustrating six standard sources and confidence regions corresponding to the six standard sources, respectively.

Referring to FIG. 2, in order to ensure the reliability of the neutral color, a confidence region (CR) is set with respect to each standard source. Except when an input image is photographed at a specific light source, such as a red glow and an artificial color lighting, the distance between a neutral color of an image and a standard illuminant is generally included within the CR that is set with respect to the standard illuminant. That is, if the chromaticity of a neutral color of an input image is detected outside the CR of all the standard sources, the light source estimation on the input image is considered to be wrong.

In addition, in consideration of a case when the standard illuminant of the input images to be synthesized may be multiple, the automatic white balance unit 110 determines the following. $NC_i$ and $std_i$ are defined as a neutral color (NC) of an $i^{th}$ input image and a standard illuminant of the $i^{th}$ input image, and when the absolute value of a difference between $NC_i$ and $std_i$ in the chromaticity diagram is less than or equal to a CR, $std_i$ is adopted as a standard illuminant of the $i^{th}$ input image. In addition, when an $i^{th}$ input image and a $j^{th}$ input image satisfy Equation 1 below and $std_i$ is different from $std_j$, the two input images are determined to be photographed at different light sources.

$$|NC_i - std_i| \leq CR_i \qquad \text{[Equation 1]}$$

The automatic white balance unit 110, after a standard illuminant is determined for each input image through the above process, independently calculates color gain factors with respect to RGB color channels for each input image, and performs a white balance.

The white balance represents correcting a chromaticity distortion of an image upon photography at different illumination conditions due to shift of red R, green G, and blue B components of a photographed image caused when a complementary metal-oxide-semiconductor (CMOS) image sensor or a charge-coupled device (CCD) image sensor fails to recognize an accurate white color.

According to an exemplary embodiment of the present invention, the white balance may be implemented using the von Kries method based on a grey world assumption (GWA).

The GWA is a theory that a combination of all colors in the world results in an achromatic color, assuming that various colors in an image average to the achromatic color over the entire image. In this case, the achromatic color is referred to as having no color component while only having brightness, in which the averages of each of RGB channels are the same. Based on the GWA assumption, the von Kries method is implemented by making the average obtained at each channel the same.

Thereafter, the wide-area image synthesis unit 120 synthesizes a wide-area image from the input images subjected to the automatic white balance by the automatic white balance unit 110. In this case, according to an exemplary embodiment of the present invention, the wide-area image synthesis method may be implemented using a method suggested in "Automatic panoramic image stitching using invariant features" by Matthew Brown.

According to the Brown's method, first, a scale invariant feature transform (SIFT) value is founded from each image. Thereafter, points matched to be determined to be the same between different two images are obtained by use of the SIFT value, and the images are rotated and translated based on the points, thereby performing a wide-area image synthesis.

Meanwhile, when each input image subjected to an automatic white balance is synthesized into a wide-area image, a color inconsistency occurs between adjacent input images. Accordingly, a region corresponding to each input image may be subject to an additional color correction after the generation of a wide-area image.

The color correction unit 130, with respect to adjacent each two input images in a wide-area image, performs a color correction based on an input image having a neutral color closer to a standard illuminant in the chromaticity diagram between the two input images.

For example, when a first to $n^{th}$ input images are sequentially combined to one another in one direction to be synthesized into a wide-area image, a color correction is performed based on one of the first and second input images, and a color correction is performed based on one of the second and third input images. Such a color correction is iteratively performed starting from the first input image to the $n^{th}$ input image.

Figure 3:
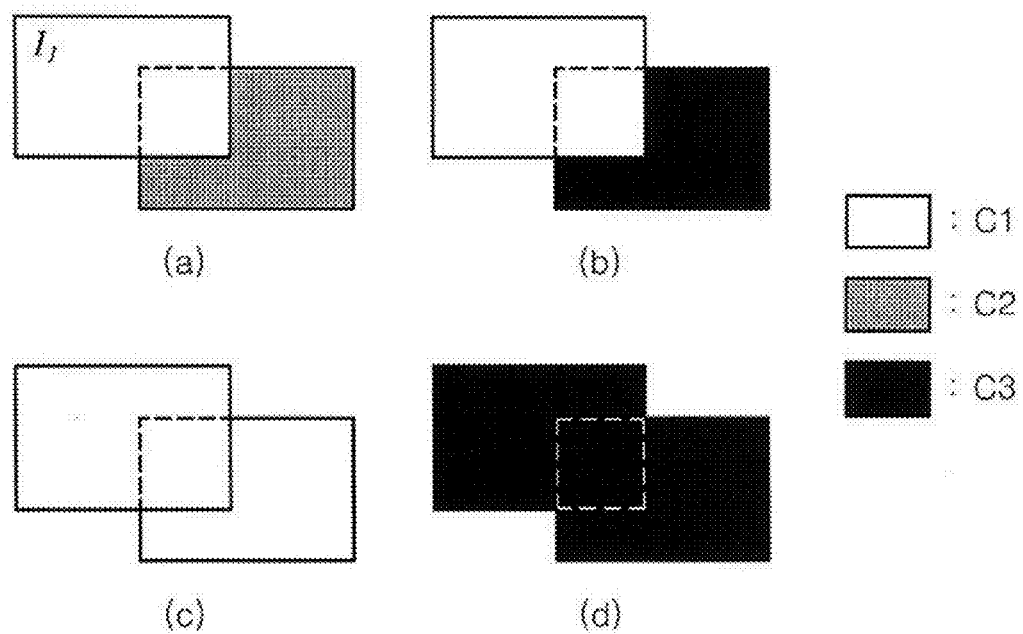
FIG. 3 is a drawing describing four types of color correction methods performed after a standard illuminant is determined and a wide-area image is synthesized.

FIG. 3 is a drawing describing four types of color correction methods performed after a standard illuminant is determined with respect to each input image and a wide-area image is synthesized.

Referring to FIG. 3, the color correction unit 130, after synthesizing input images into a wide-area image, divides the input images in the wide-area image into three types C1, C2, and C3, and classifies the color correction method into four types depending on the types of images.

Hereinafter, the three types of input images will be described. First, an input image having a neutral color closer to a standard illuminant in the chromaticity diagram between two input images to be color corrected is defined as C1.

Second, an input image having a neutral color distant from the standard illuminant in the chromaticity diagram between the two input images is defined as C2.

The color correction unit 130, when adjacent two input images correspond to types C1 and C2, respectively, determines an input image $I_1$ corresponding to type C1 to have a higher priority than an input image $I_2$ corresponding to type C2, and performs a color correction such that a color distribution of the image $I_2$ is adjusted to a color distribution of the image $I_1$.

Third, an input image whose neutral color is not included within a confidence region of the standard illuminant in the chromaticity diagram is defined as C3. In this case, the color correction unit 130 determines that the standard illuminant of the input image is wrongly estimated, and keeps the input image without performing a color correction on the input image.

Hereafter, a method of the color correction unit 130 performing a color correction according to the types of C1, C2, and C3 of input images will be described in detail. The closer to a standard illuminant a neutral color is, the more natural and realistic color is represented. Accordingly, an input image of type C1 serves as a reference for performing a color correction on an input image of type C2.

(a) of FIG. 3 represents a case when the image $I_1$ corresponds to type C1, and the image $I_2$ corresponds to type C2. Accordingly, the image $I_1$ serves as a reference for performing a color correction on the image $I_2$. Accordingly, the color correction unit 130 performs a color correction such that a color distribution of the image $I_2$ is adjusted to a color distribution of the image $I_1$. In this case, the color correction is performed through Equations 2 and 3 below.

$$\hat{I}_2 = A_{21} I_2 \qquad \text{[Equation 2]}$$

$$A_{21} = \begin{bmatrix} \alpha & & \\ & \beta & \\ & & \gamma \end{bmatrix}, \alpha = \frac{\text{mean}(I^O_{1,R})}{\text{mean}(I^O_{2,R})} \qquad \text{[Equation 3]}$$

In Equations 2 and 3, $A_{21}$ is a color correction matrix that is applied to the image $I_2$, and matrix elements $\alpha$, $\beta$, and $\gamma$ are gain values applied to R, G, and B components. $\alpha$ is defined as a proportion of R values in an overlap region of two images in a wide-area image, and $\beta$ and $\gamma$ are defined as proportions of G and B values in the overlap region of two images, respectively.

(b) of FIG. 3 represents a case when the image $I_1$ corresponds to type C1, and the image $I_2$ corresponds to type C3. In this case, the standard illuminant of the image $I_2$ is determined to be wrongly estimated, and thus the color correction unit 130 does not perform a color correction on the $I_2$ image.

(c) of FIG. 3 represents a case when both of the image $I_1$ and the image $I_2$ correspond to type C1. When the distances of neutral colors of the images $I_1$ and $I_2$ from the standard illuminant are not the same, a color correction may be performed based on an image whose neutral color is closer to the standard illuminant.

(d) of FIG. 3 represents a case when both of the image $I_1$ and the image $I_2$ correspond to type C3. In this case, the standard illuminants of the images $I_1$ and $I_2$ are determined to be wrongly estimated, and thus the color correction unit 130 does not perform a color correction on the images $I_1$ and $I_2$.

Figure 4:
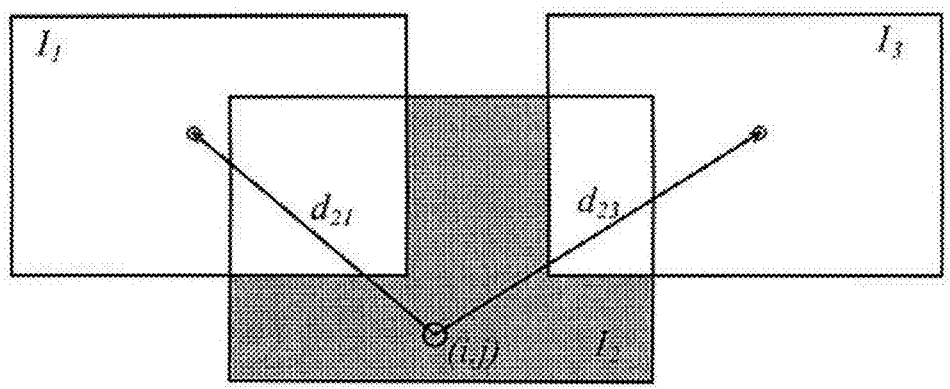
FIG. 4 is a drawing describing a color correction reference when a plurality of input images adjacent to an input image desired to be color corrected serve as a color correction reference for the input image.

FIG. 4 is a drawing describing a color correction reference when a plurality of input images adjacent to an input image desired to be color corrected serve as a color correction reference for the input image.

Referring to FIG. 4, among sequentially adjacent images $I_1$ to $I_3$ in a wide-area image, an image $I_2$ corresponds to type C2, and images $I_1$ and $I_3$ correspond to type C1. Accordingly, during the color correction by the color correction unit 130, not only the image $I_1$ but also the image $I_3$ may serve as a reference for performing a color correction on the image $I_2$. In a case when the color correction unit 130 performs a color correction on the image $I_2$ to be adapted to the image $I_3$, an overlap region between the images $I_1$ and $I_2$ has a great color difference.

Accordingly, in this case, the color correction unit 130 performs a color correction such that both of the images $I_1$ and $I_3$ exert an influence on the color correction of the image $I_2$ through Equation 4 below. That is, pixels of the image $I_2$ close to the image $I_1$ are corrected based on the color distribution of the image $I_1$, and pixels of the image $I_2$ close to the image $I_3$ are corrected based on the color distribution of the image $I_3$.

$$\hat{I}_2(i, j) = \left( \frac{d_{23}}{d_{21} + d_{23}} A_{21} + \frac{d_{21}}{d_{21} + d_{23}} A_{23} \right) I_2(i, j) \qquad \text{[Equation 4]}$$

In this case, $d_{21}$ represents a distance between a pixel $(i, j)$ of the image $I_2$ and a center point of the image $I_1$, and $d_{23}$ represents a distance between the pixel $(i, j)$ of the image $I_2$ and a center point of the image $I_3$. Accordingly, by combining two correction matrices having the image $I_1$ and image $I_3$ as a reference for color correction, respectively, an image synthesis is performed while having natural colors in between the adjacent two images.

Figure 5:
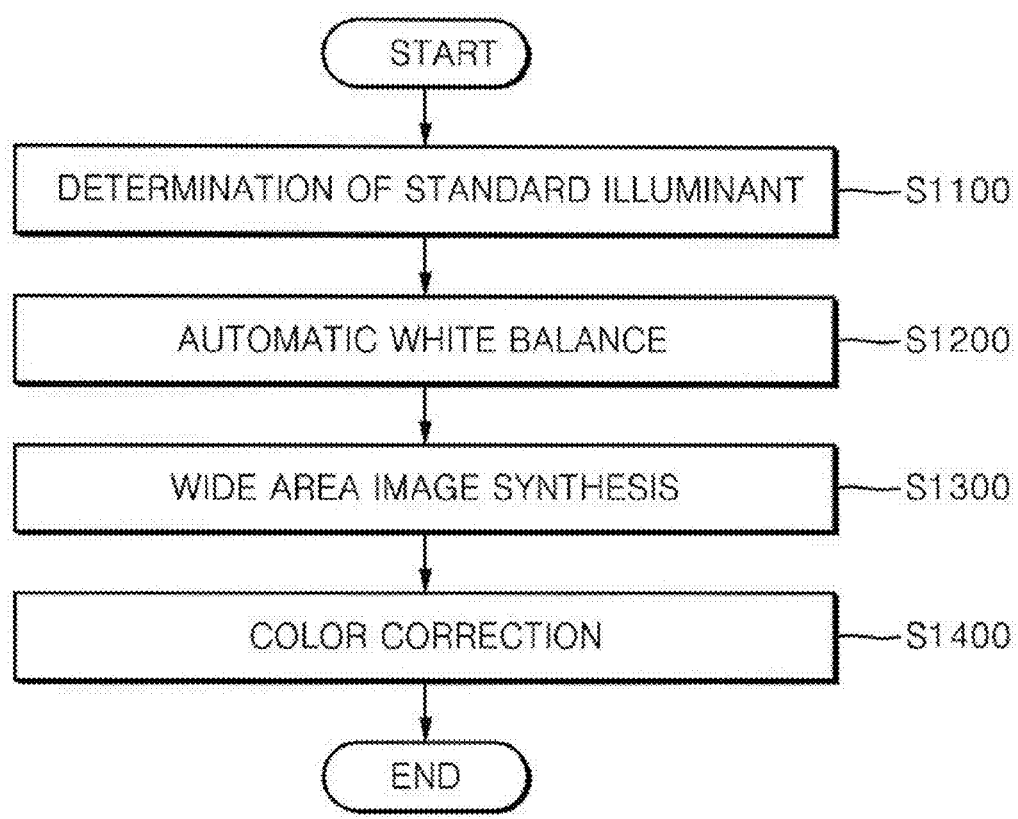
FIG. 5 is a flowchart showing an execution process of a color balancing method according to an exemplary embodiment of the prevent invention.

FIG. 5 is a flowchart showing an execution process of a color balancing method according to an exemplary embodiment of the prevent invention.

Referring to FIG. 5, the automatic white balance unit 110 extracts a neutral color from each of a plurality of input images by use of a multiple assumption based light source estimation method, and determines a standard illuminant (S1100). Thereafter, the automatic white balance unit 110, after determining the standard illuminant, independently calculates color gain factors with respect to RGB color channels for each input image, and performs an automatic white balance (S1200).

The wide-area image synthesis unit 120 synthesizes input images subjected to the automatic white balance by the automatic white balance unit 110 into a wide-area image (S1300).

The color correction unit 130 obtains gain factors by use of ratios of neutral colors of adjacent two input images to the standard illuminant while having an input image whose neutral color is closer to the standard illuminant between the adjacent two images in a wide-area image as a color correction reference, and applies the gain factors to RGB color channels, thereby performing a color correction (S1400).

Hereinafter, an experiment to evaluate the performance of the present invention will be described.

Figure 6:
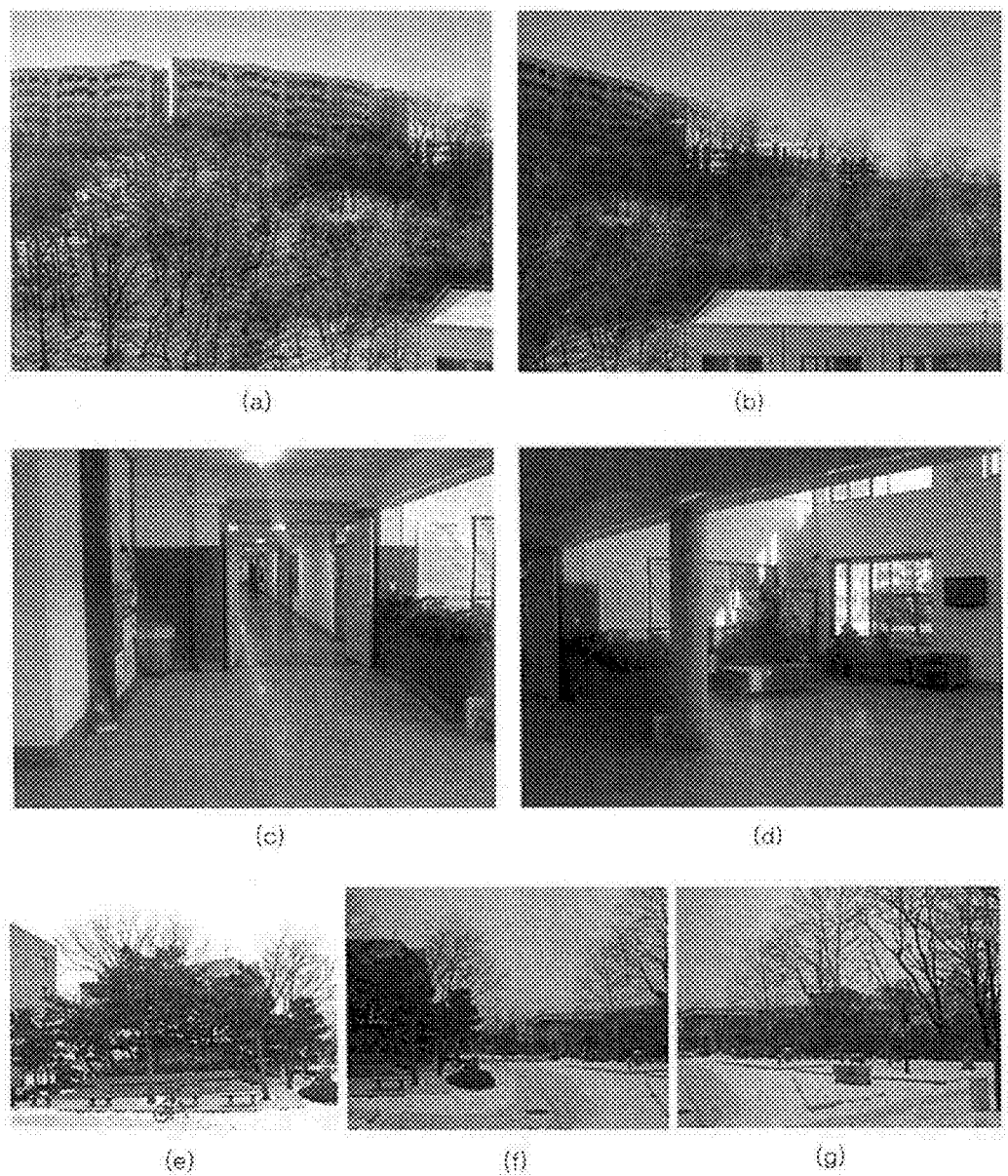
FIG. 6 is a drawing illustrating a plurality of source images to be synthesized into a wide-area image.

FIG. 6 is a drawing illustrating a plurality of images to be synthesized into a wide-area image, the image photographed by a general compact digital camera with an automatic white balance function turned on while having a format of 800*600.

Figure 7:
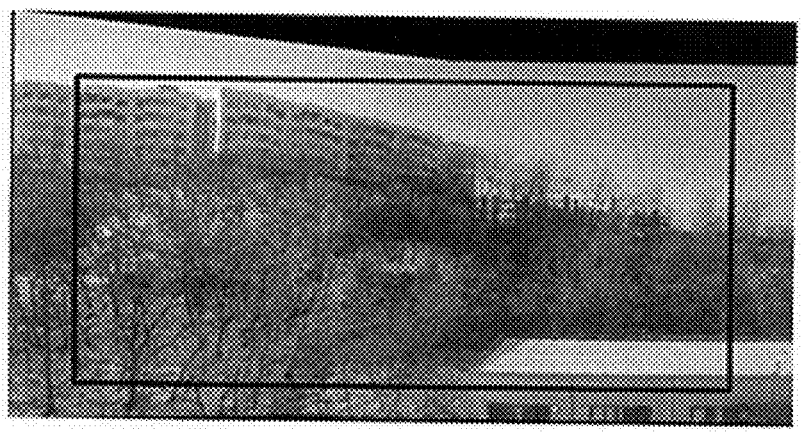
FIG. 7 is a drawing illustrating a resultant image obtained by synthesizing the images of FIG. 6 by use of the conventional wide-area image synthesis method.
Figure 7:
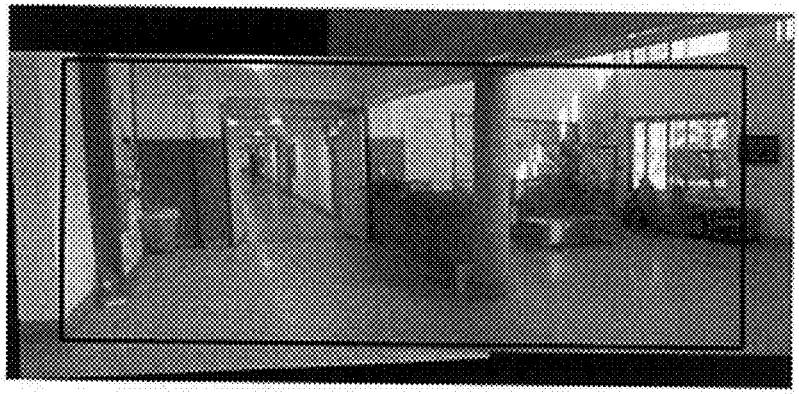
Figure 7:
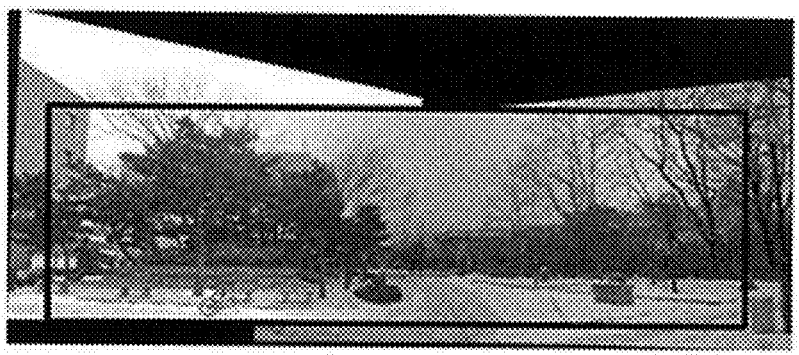

FIG. 7 is a drawing illustrating a resultant image obtained by synthesizing the images of FIG. 6 by use of the conventional wide-area image synthesis method.

Figure 8:
FIG. 8 is a drawing illustrating a resultant image obtained by synthesizing (a) of FIG. 6 by use of the color balancing apparatus according to the present invention.
Figure 8:
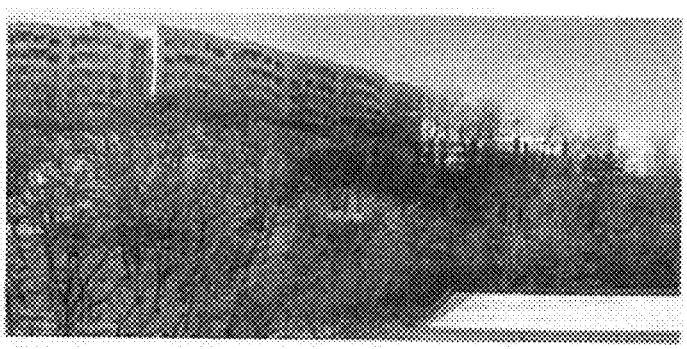
Figure 8:
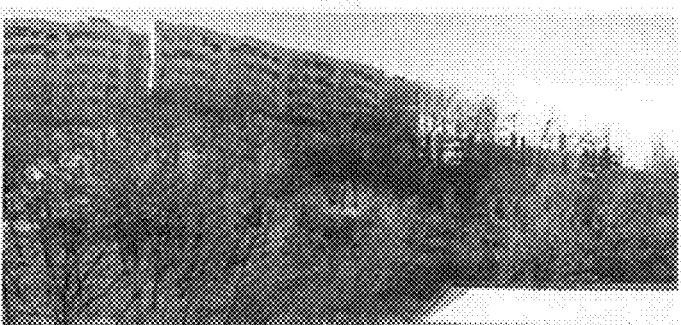
Figure 8:
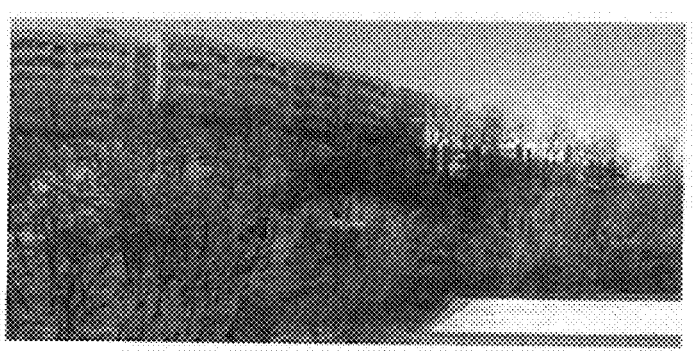

FIG. 8 is a drawing illustrating a resultant image obtained by synthesizing (a) of FIG. 6 by use of the color balancing apparatus according to the present invention.

Referring to FIG. 8, (a) of FIG. 8 is a simple result of a wide-area image synthesis, (b) of FIG. 8 is a result of a wide-area image synthesis subjected to an automatic white balance by the automatic white balance unit 110, (c) of FIG. 8 is a result of a wide-area image synthesis subjected to a color correction by the color correction unit 130, and (d) of FIG. 8 is a result of a wide-area image synthesis subjected to an automatic white balance by the automatic white balance unit 110 and a color correction by the color correction unit 130.

Figure 9:
FIG. 9 is a drawing illustrating a resultant image obtained by synthesizing (b) of FIG. 6 by use of the color balancing apparatus according to the present invention.
Figure 9:
Figure 9:
Figure 9:

FIG. 9 is a drawing illustrating a resultant image obtained by synthesizing (b) of FIG. 6 by use of the color balancing apparatus according to the present invention.

Referring to FIG. 9, (a) of FIG. 9 is a simple result of a wide-area image synthesis, (b) of FIG. 9 is a result of a wide-area image synthesis subjected to an automatic white balance by the automatic white balance unit 110, (c) of FIG. 9 is a result of a wide-area image synthesis subjected to a color correction by the color correction unit 130, and (d) of FIG. 9 is a result of a wide-area image synthesis subjected to an automatic white balance by the automatic white balance unit 110 and a color correction by the color correction unit 130.

Figure 10:
FIG. 10 is a drawing illustrating a resultant image obtained by synthesizing (c) of FIG. 6 by use of the color balancing apparatus according to the present invention.
Figure 10:

FIG. 10 is a drawing illustrating a resultant image obtained by synthesizing (c) of FIG. 6 by use of the color balancing apparatus according to the present invention. Similar to FIGS. 8 and 9, a color difference between input images is viewed to be corrected.

The disclosure can also be embodied as computer readable codes on a computer readable recording medium. Also, functional programs, codes, and code segments for accomplishing the present invention can be easily construed by programmers skilled in the art to which the present invention pertains. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves such as data transmission through the Internet. The computer readable recording medium can also be distributed over network-coupled computer systems so that the computer readable codes are stored and executed in a distributed fashion.

According to the color balancing apparatus for multiple image synthesis and a method therefor, a natural wide-area synthesis image is generated through a light source estimation scheme considering multiple light sources, while avoiding complex computation of the conventional wide-area image synthesis.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A color balancing apparatus for multiple image synthesis, the color balancing apparatus comprising:
   a computer processor;
   a non-transitory data storage device;
   computer readable code stored in the non-transitory data storage device and executable by the computer processor, the computer readable code defining functional units which include:
   an automatic white balance unit, with respect to each of a plurality of input images that are obtained by sequentially capturing adjacent scenes, to compare a neutral color representing the input image with chromaticity of standard sources that are predefined, determine a neutral color standard source among the standard sources as a standard illuminant, and perform a white balance on the input image based on the standard illuminant;
   a wide-area image synthesis unit to generate a single wide-area image by synthesizing the plurality of input images subjected to the white balance based on the standard illuminant; and
   a color correction unit, with respect to two adjacent input images in the wide-area image, to perform a color correction based on the input image whose neutral color better approximates the standard illuminant than the neutral color of another input image approximates the standard illuminant.

2. The color balancing apparatus of claim 1, wherein the color correction unit, in a case when both of a first image and a third image among adjacent three sequential input images in the wide-area image serve as a reference for performing a color correction on a second image, is configured to correct pixels of the second image whose distances are closer to the first image than to the third image based on the first image and correct pixels of the second image whose distances are closer to the third image than to the first image based on the third image.

3. The color balancing apparatus of claim 1, wherein the color correction unit does not perform a color correction on an input image whose neutral color is distant from the standard illuminant in a chromaticity diagram by a distance exceeding a predetermined confidence region.

4. The color balancing apparatus of claim 1, wherein the automatic white balance unit determines the neutral color of the input image based on a grey world assumption, a white patch assumption, and a color clustering assumption.

5. The color balancing apparatus of claim 1, wherein the automatic white balance unit determines the neutral color of the input image based on a grey world assumption, a white patch assumption, and a color clustering assumption.

6. The color balancing apparatus of claim 2, wherein the color correction unit does not perform a color correction on an input image whose neutral color is distant from the standard illuminant in a chromaticity diagram by a distance exceeding a predetermined confidence region.

7. The color balancing apparatus of claim 2, wherein the automatic white balance unit determines the neutral color of the input image based on a grey world assumption, a white patch assumption, and a color clustering assumption.

8. A color balancing method for multiple image synthesis, the color balancing method comprising:
   an automatic white balance, with respect to each of a plurality of input images that are obtained by sequentially capturing adjacent scenes, comparing a neutral color representing the input image with chromaticity of standard sources that are predefined, determining a neutral color standard source among the standard sources as a standard illuminant, and performing a white balance on the input image based on the standard illuminant; and a wide-area image synthesis generating a single wide-area image by synthesizing the plurality of input images subjected to the white balance based on the standard illuminant; and with respect to two adjacent input images in the wide-area image, performing a color correction based on the input image whose neutral color better approximates the standard illuminant than the neutral color of another input image approximates the standard illuminant.

9. The color balancing method of claim 8, wherein in the performing of the color correction, in a case when both of a first image and a third image among adjacent three sequential input images in the wide-area image serve as a reference for performing a color correction on a second image, pixels of the second image whose distances are closer to the first image than to the third image, are corrected based on the first image and pixels of the second image, whose distances are closer to the third image than to the first image, are corrected based on the third image.

10. The color balancing method of claim 8, wherein in the performing of the color correction, a color correction on an input image whose neutral color is distant from the standard illuminant in a chromaticity diagram by a distance exceeding a predetermined confidence region is not performed.

11. The color balancing method of claim 8, wherein in the automatic white balance, the neutral color of the input image is determined based on a grey world assumption, a white patch assumption, and a color clustering assumption.

12. The color balancing method of claim 8, wherein in the automatic white balance, the neutral color of the input image is determined based on a grey world assumption, a white patch assumption, and a color clustering assumption.

13. The color balancing method of claim 9, wherein in the performing of the color correction, a color correction on an input image whose neutral color is distant from the standard illuminant in a chromaticity diagram by a distance exceeding a predetermined confidence region is not performed.

14. The color balancing method of claim 9, wherein in the automatic white balance, the neutral color of the input image is determined based on a grey world assumption, a white patch assumption, and a color clustering assumption.

15. A non-transitory computer readable recording medium recording a program for executing color balancing method for multiple image synthesis on a computer, the color balancing method comprising:

an automatic white balance, with respect to each of a plurality of input images that are obtained by sequentially capturing adjacent scenes, comparing a neutral color representing the input image with chromaticity of standard sources that are predefined, determining a neutral color standard source among the standard sources as a standard illuminant, and performing a white balance on the input image based on the standard illuminant;

a wide-area image synthesis generating a single wide-area image by synthesizing the plurality of input images subjected to the white balance based on the standard illuminant, and with respect to two adjacent input images in the wide-area image, performing a color correction based on the input image whose neutral color better approximates the standard illuminant than the neutral color of another input image approximates the standard illuminant.

\* \* \* \* \*